United States Patent
Yamada et al.

(10) Patent No.: US 8,439,145 B2
(45) Date of Patent: May 14, 2013

(54) SCOOTER-TYPE VEHICLE

(75) Inventors: Hiroshi Yamada, Wako (JP); Mitsuru Terada, Wako (JP); Tsubasa Ishii, Wako (JP)

(73) Assignee: Honda Motor Co., Ltd, Tokyo (JP)

( * ) Notice: Subject to any disclaimer, the term of this patent is extended or adjusted under 35 U.S.C. 154(b) by 230 days.

(21) Appl. No.: 12/875,656

(22) Filed: Sep. 3, 2010

(65) Prior Publication Data

US 2011/0073397 A1   Mar. 31, 2011

(30) Foreign Application Priority Data

Sep. 30, 2009  (JP) ................ 2009-228796

(51) Int. Cl.
  *B62M 7/00*  (2010.01)
  *B60K 11/04*  (2006.01)
(52) U.S. Cl.
  USPC ............... 180/219; 180/69.4; 280/835
(58) Field of Classification Search .......... 180/219, 180/225, 69.4; 280/834, 835; 123/495, 509
  See application file for complete search history.

(56) References Cited

U.S. PATENT DOCUMENTS

| 4,726,439 | A  | * | 2/1988  | Iwao et al. ............... 180/219 |
| 4,964,483 | A  | * | 10/1990 | Yokoyama et al. ........ 180/219 |
| 5,433,286 | A  | * | 7/1995  | Kumamaru et al. ....... 180/219 |
| 6,626,155 | B1 | * | 9/2003  | Ueda et al. ............... 123/509 |
| 6,932,177 | B2 | * | 8/2005  | Hara et al. ............... 180/219 |
| 2001/0028168 | A1 | * | 10/2001 | Nakagawa ............. 280/830 |
| 2002/0038653 | A1 | * | 4/2002  | Kobayashi et al. ....... 123/509 |
| 2002/0166709 | A1 | * | 11/2002 | Michisaka et al. ....... 180/219 |
| 2003/0132837 | A1 | * | 7/2003  | Hasegawa et al. ........ 340/440 |
| 2011/0073396 | A1 | * | 3/2011  | Yamada et al. .......... 180/219 |

FOREIGN PATENT DOCUMENTS

| JP | 10-203457 A  | 8/1998 |
| JP | 2002-206466 A | 7/2002 |

* cited by examiner

*Primary Examiner* — Anne Marie M Boehler
(74) *Attorney, Agent, or Firm* — Westerman, Hattori, Daniels & Adrian, LLP

(57) ABSTRACT

A scooter-type vehicle can freely set a capacity of a fuel filter without being restricted by swing of a unit-swing type engine. A cross pipe is spanned between a pair of left and right lower frames and a lower end of a down frame is connected to a central portion of the cross pipe. A fuel filter is disposed so that its lower end is higher by distance than the lower end of cross pipe. The fuel filter is disposed between the down frame and the fuel tank. Since the fuel filter is disposed in front of the fuel tank, it is not restricted by the swing of an engine located rearward of the fuel tank. Therefore, a capacity of the fuel filter can freely be set.

10 Claims, 10 Drawing Sheets

SCOOTER-TYPE VEHICLE

TECHNICAL FIELD

An improvement of a scooter-type vehicle is disclosed. Specifically, an improvement in arrangement of a fuel filter installed in a scooter-type vehicle is disclosed.

BACKGROUND OF THE INVENTION

There is known a traditional scooter-type vehicle in which a fuel filter is installed at an intermediate portion of a fuel supply passage for supplying the fuel in a fuel tank to a combustion chamber of an engine (see e.g. Japanese Patent Laid-open No. 2002-206466 (FIGS. 1 and 2)).

As illustrated in Japanese Patent Laid-open No. 2002-206466, a scooter-type vehicle includes a unit-swing type engine swingably mounted to a rear frame and a fuel tank disposed below a step floor on which occupant's feet are placed in front of the engine.

As further illustrated in Japanese Patent Laid-open No. 2002-206466, the fuel in the fuel tank passes through a delivery tube and is supplied to a fuel filter for purification. Then, the purified fuel is supplied to the engine via a fuel pump.

As illustrated in Japanese Patent Laid-open No. 2002-206466, the fuel filter is disposed rearward of a fuel tank in the anteroposterior direction of the vehicle and in a space below a cylinder head and a head cover. In this case, the cylinder head and the head cover are also swung up and down along with the swing of the unit-swing type engine. Thus, the cylinder head and the head cover come close to the fuel filter.

To ensure a clearance between fuel filter, and the cylinder head and the head cover when they come close to each other, a method for downsizing the fuel filter may be conceivable. However, if the fuel filter is downsized, a replacement cycle of the fuel filter element may be short in some cases.

SUMMARY OF THE INVENTION

A scooter-type vehicle is disclosed that can freely set a capacity of a fuel filter without being restricted by swing of a unit-swing type engine.

A first aspect of the disclosure is characterized in that in a scooter-type vehicle includes a body frame including a down frame extending downwardly from a head pipe, a lower frame extending rearwardly from a lower portion of the down frame and a rear frame extending rearward and obliquely upward from a rear portion of the lower frame; a step floor which is disposed above the lower frame and on which rider's feet are placed; a fuel tank disposed rearward of the down frame and below the step floor; an engine swingably supported behind the fuel tank by the body frame; a fuel supply passage for supplying fuel in the fuel tank to the engine; and a fuel filter for purifying fuel disposed in an intermediate portion of the fuel supply passage. The fuel filter is disposed between the down frame and the fuel tank in the front-to-rear direction of the vehicle.

A second aspect of the disclosure is characterized in that the lower frame is composed of left and right lower frame portions, a cross pipe extending in a vehicle-width direction is spanned between the left and right lower portions at a position forward of the fuel tank, and the fuel filter is disposed between the cross pipe and the fuel tank so that a longitudinal direction of the fuel filter runs along the vehicle-width direction.

A third aspect of the disclosure is characterized in that the fuel filter has a lower end higher than a lower end of the cross pipe.

A fourth aspect of the disclosure is characterized in that a filter support clip formed in a general C-shape and supporting the fuel filter, and the fuel filter is detachably attached to the cross pipe by elastically deforming the filter support clip.

A fifth aspect of the disclosure is characterized in that the filter support clip is open toward the oblique rearward and upward direction of the vehicle.

A sixth aspect of the disclosure is characterized in that a pump-anterior filter for purifying the fuel in the fuel tank, a fuel pump disposed on the downstream side of the pump-anterior filter, the fuel filter disposed on the downstream side of the fuel pump, and an injector for injecting fuel toward the engine are arranged on the fuel supply passage in this order. This aspect is further characterized in that the fuel filter is set to have finer meshes than those of the pump-anterior filter; and in that the step floor is provided above the fuel filter with an access hole and a lid used to open and close the access hole.

A seventh aspect of the disclosure is characterized in that a pressure regulator for returning part of fuel to the fuel tank when fuel pressure between the fuel pump and the injector in the fuel supply passage increases and reaches a predetermined pressure is provided on the downstream side of the fuel filter, and the pressure regulator is disposed below the access hole so as to have a longitudinal direction running along a vehicle-width direction and to adjacently align with the fuel filer in the vehicle-width direction.

An eighth aspect of the disclosure is characterized in that the fuel filter is disposed at a position lower than the injector in a vertical direction of the vehicle.

In the first aspect, since the fuel filter is disposed between the down frame and the fuel tank, the size of the fuel filer can freely be set without being restricted by the swing of the engine located rearward of the fuel tank.

Additionally, the space between the down frame and the fuel tank tends to become a dead space. However, according to the first aspect, the fuel filter is disposed in the space defined between the down frame and the fuel tank. Therefore, the dead space defined between the down frame and the fuel tank can effectively be utilized.

In the second aspect, the fuel filter is disposed such that its longitudinal direction runs in the vehicle-width direction. If the longitudinal direction of the fuel filter is disposed to run along the back and forth direction of the vehicle, between the cross pipe in front of the fuel tank and the fuel tank broadens unsatisfactorily. In this regard, according to the second aspect, the cross pipe and the fuel tank can be disposed as close to each other as possible, so that the vehicle can be downsized in the back and forth direction of the vehicle.

Additionally, the cross pipe is located vehicle-forward of the fuel filter and the lower frame portions are located to the left and right. Therefore, the fuel filter can be protected by the cross pipe and the lower frames.

In the third aspect, the lower end of the fuel filter is located higher than the lower end of the cross pipe. Therefore, the lower portion of the fuel filter can be protected by the cross pipe.

In the fourth aspect, the filter support clip is formed in a general C-shape and the fuel filter is detachably attached by elastically deforming the filter support clip. Therefore, the attachment and detachment work for the fuel filter can easily be performed without using a tool.

In the fifth aspect, since the filter support clip is open toward the oblique rearward and upward direction of the vehicle, the attachment and detachment direction of the fuel filter is an oblique direction. A shorter distance between the filter support clip and the fuel tank in the back and forth direction of the vehicle, necessary to attach and detach the fuel filter, is required compared with the case where the attachment and detachment direction is a horizontal direction. Therefore, the fuel filter and the fuel tank can be disposed close to each other. Thus, the vehicle can be downsized in the back and forth direction thereof.

In the sixth aspect, since the fuel filter is set to have finer meshes than those of the pump-anterior filter, the pump-anterior filter can capture large dust and the fuel filter can capture the fine dust that has passed through the pump-anterior filter. Since the fuel filter does not capture large dust, it is hard to be clogged, which can reduce its replacement frequency. Additionally, since the pump-anterior filter has the coarse meshes, it is hard to be clogged. Thus, the pump-anterior filter can be prevented from serving as resistance against the fuel pump, so that the inexpensive fuel pump can be employed.

Consequently, the replacement cycle of both the pump-anterior filter and the fuel filter can be lengthened and the frequency of maintenance can be reduced. In addition, an amount of fuel passing through the pump-anterior filter and the fuel filter can satisfactorily be maintained for a long period of time. Even if a necessary fuel flow rate increases suddenly, the pump-anterior filter and the fuel filter can sufficiently deal with such an event.

Because of having fine meshes, the fuel filter can capture fine dust even in the case of using fuel with fine dust such as ethanol. On the other hand, the fuel filter is set to have finer meshes than those of the pump-anterior filter in order to make it possible to use even fuel with fine dust such as ethanol. Therefore, the fuel filter becomes shorter in replacement cycle than the pump-anterior filter. However, since the step floor is provided with the access hole and the openable/closable lid for maintenance, the replacement work can be facilitated.

Further, since the fuel filter can be attached to and detached from the filter support clip without use of a tool, it is not necessary for the step floor to be provided with such a large access hole as to receive a tool insertable thereinto. Therefore, it is possible to make the access hole and the maintenance lid provided in the step floor small, the maintenance lid being used to open and close the access hole.

In the seventh aspect, the pressure regulator is disposed to have a longitudinal direction running along a vehicle-width direction and to adjacently align with the fuel filer in the vehicle-width direction. In this way, by using the access hole provided in the step floor, the attachment and detachment of the pressure regulator can be done along with the attachment and detachment of the fuel filter.

In the eighth aspect, the fuel filter is disposed at a position lower than the injector. Therefore, in the case where the vehicle is parked for a long period of time, it is possible to prevent fuel from leaking from the injector due to the weight of the fuel staying in the fuel filter.

BRIEF DESCRIPTION OF THE DRAWINGS

The advantages of the invention will become apparent in the following description taken in conjunction with the drawings, wherein.

DETAILED DESCRIPTION OF THE INVENTION

Figure 1:
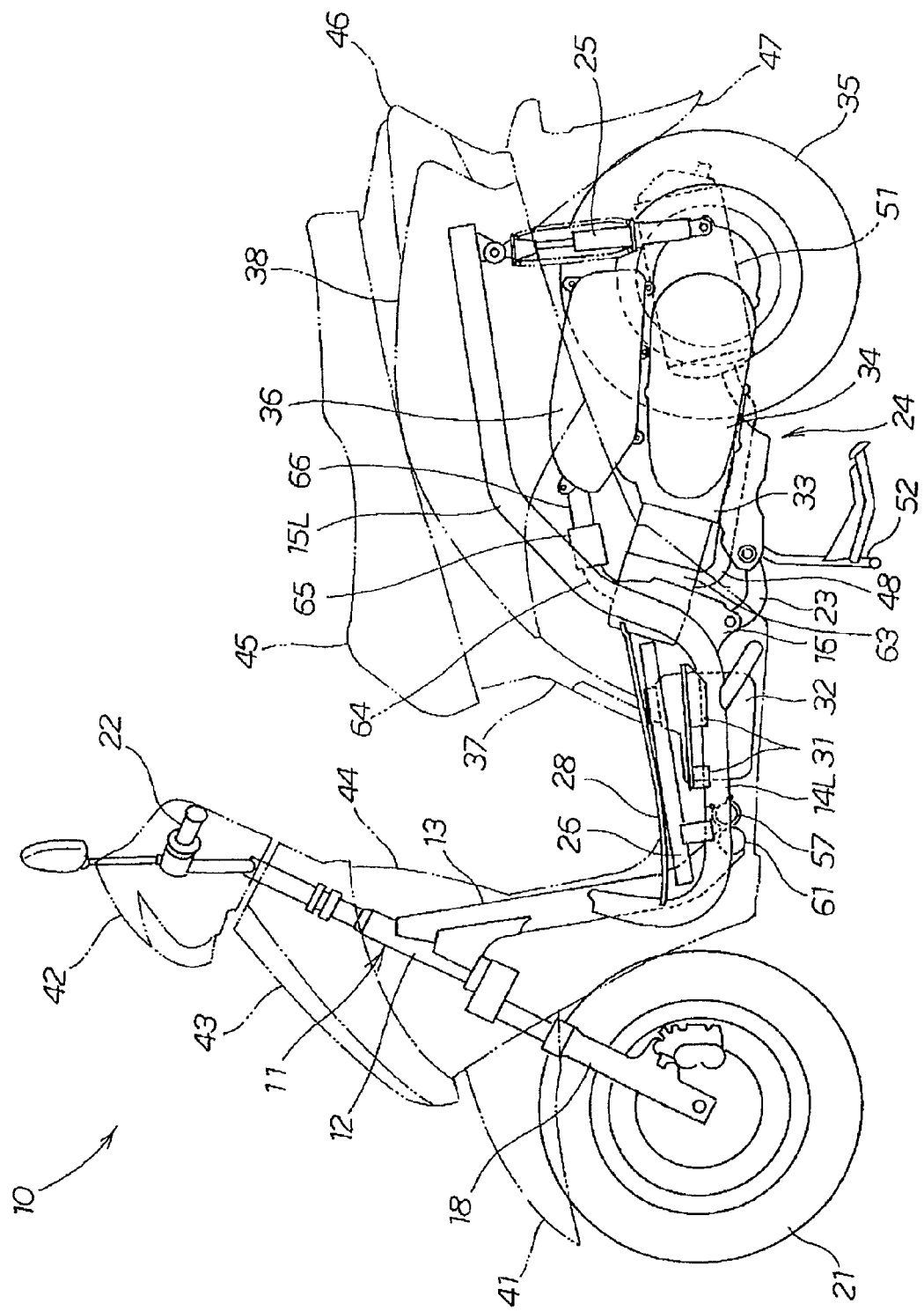
FIG. 1 is a lateral view of a scooter-type vehicle.

Embodiments of the present invention will hereinafter be described with reference to the accompanying drawings. Incidentally, the drawings shall be viewed in the direction of reference symbols. In addition, arrows (FRONT) in the drawings represent the front of a vehicle.

An embodiment is first described with reference to the drawings.

Referring to FIG. 1, a scooter-type vehicle 10 as a motorcycle includes a body frame 11 serving as a framework. The body frame 11 includes a head pipe 12 forming a front end portion; a down frame 13 extending downward from the head pipe 12; and a pair of left and right lower frames 14L and 14R (only reference symbol 14L is illustrated) extending rearward from the lower portion of the down frame 13. The body frame 11 further includes a pair of left and right rear frames 15L and 15R (only reference symbol 15L is illustrated) extending rearward and obliquely upward from corresponding rear portions of the lower frames 14L and 14R; and a pair of left and right link support brackets 16 and 17 (only reference symbol 16 is illustrated) joined to the corresponding respective intermediate portions of the rear frames 15L and 15R.

The head pipe 12 is steerably attached to a front fork 18. A front wheel 21 is attached to a lower end of the front fork 18. A handlebar 22 is attached to an upper end of the head pipe 12.

The scooter-type vehicle 10 is such that a power unit 24 is vertically swingably mounted to the link support brackets 16 and 17 via a link 23. A rear cushion unit 25 is mounted so as to be spanned between the rear end portion of the power unit 24 and the rear end portion of the rear frame 15.

A pair of left and right floor pipes 26 and 27 (only reference symbol 26 is illustrated) is provided above the corresponding lower frames 14L and 14R. The floor pipes 26 and 27 support a step floor 28 on which operator's feet are placed. A fuel tank 32 is provided on the lower frames 14L and 14R via fuel tank support brackets 31.

The power unit 24 is composed of an engine 33 forming a front portion and a continuously variable transmission 34 integrally coupled to a rear portion of the engine 33. A rear wheel 35 is attached to a rear portion of the continuously variable transmission 34.

Incidentally, reference numeral 36 denotes an air cleaner, 37 denotes a body-central cover, 38 denotes a body-rear cover, 41 denotes a front fender, and 42 denotes a handlebar cover. In addition, reference numeral 43 denotes a front cover, 44 denotes a leg shield, 45 denotes a seat, 46 denotes a tail lamp, 47 denotes a rear fender, 48 denotes an exhaust pipe, 51 denotes a muffler and 52 denotes a main stand.

A fuel supply device is next described.

Figure 2:
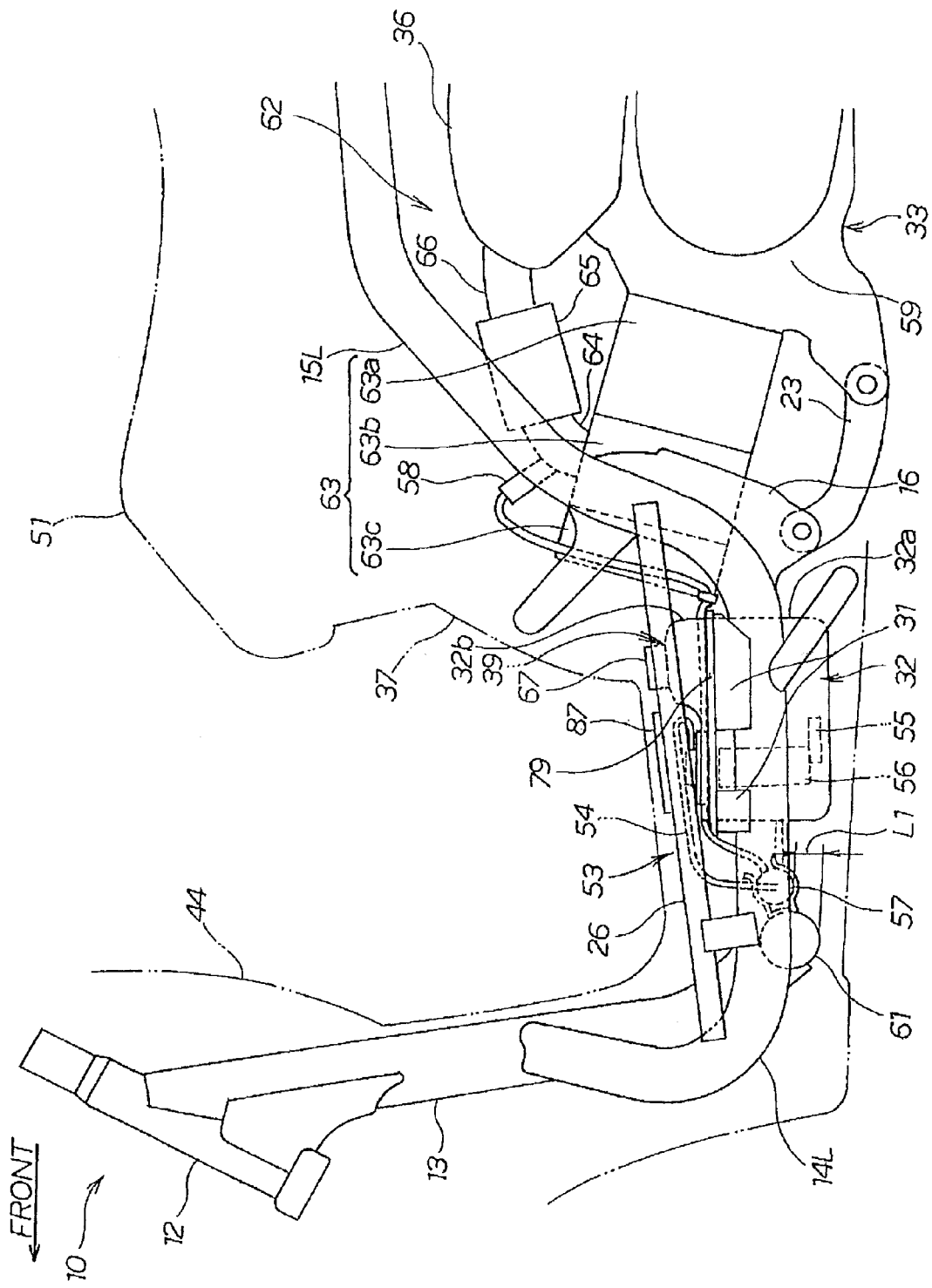
FIG. 2 is a lateral view of a fuel supply device disposed on a body frame.

Referring to FIG. 2, a fuel supply device 53 includes the fuel tank 32 and a fuel supply passage 54 for supplying the fuel in the fuel tank 32 to the engine 33. A pump-anterior filter 55, a fuel pump 56, a fuel filter 57, and an injector 58 are arranged on the fuel supply passage 54 in this order. The pump-anterior filter 55 is provided to purify the fuel in the fuel tank 32. The fuel pump 56 is disposed on the downstream side of the pump-anterior filter 55. The fuel filter 57 is disposed on the downstream side of the fuel pump 56. The injector 58 is provided to inject fuel toward the engine 33. Incidentally, the pump-anterior filter 55 and the fuel pump 56 are installed in the fuel tank 32 and the injector 58 is mounted to an intake pipe 64.

A cross pipe 61 is spanned between the left and right lower frames 14L and 14R (only reference symbol 14L is illustrated). A central portion of the cross pipe 61 is coupled to a lower end of the down frame 13 (see FIG. 4).

The fuel filter 57 is disposed such that its lower end is located at a position higher by distance L1 than the lower end of the cross pipe 61 as viewed from the side of the vehicle. The fuel filter 57 is disposed between the down frame 13 and the fuel tank 32.

The fuel filter 57 is set to have finer meshes than those of the pump-anterior filter 55. In addition, the fuel filter 57 is disposed at a position lower than the injector 58 in the vertical direction of the vehicle.

The fuel filter 57 is set to have finer meshes than those of the pump-anterior filter 55, that is, the mesh coarseness of the fuel filter 57 is made different from that of the pump-anterior filter 55. Therefore, even in the case of using fuel with fine dust such as ethanol, the fine dust that has not been captured by the pump-anterior filter 55 can be captured by the fuel filter 57. Thus, fuel such as ethanol or the like can be used.

Incidentally, the fuel tank 32 is a container formed by putting a tank upper-half body 32b protruding upward over a tank lower-half body 32a concaved downward and joining their flange portions 79 together for integration. The tank upper-half body 32b is provided at a rear portion with an upward extending filler neck 39, which is provided with a fuel cap 67. The fuel pump 56 is inserted into the tank 32 from above and mounted in the front portion of the tank upper-half body 32b. Incidentally, the pump-anterior filter 55 is attached to the fuel pump 56.

The engine 33 includes a crankcase 59 housing a crankshaft (not illustrated) and a cylinder portion 63 protruding from the crankcase 59 toward the front of the vehicle. The cylinder portion 63 is composed of a cylinder block 63a, a cylinder head 63b and a head cover 63c in order from the crankcase 59.

An intake device is next described.

Referring to FIG. 2, an intake device 62 includes an intake pipe 64 connected to an upper portion of the cylinder head 63b, a throttle body 65 connected to the intake pipe 64, and the air cleaner 36 connected to the throttle body 65 via a connecting tube 66.

A fuel supply device 53 to which fuel is supplied from the fuel tank 32 is connected to the intake pipe 64.

Figure 3:
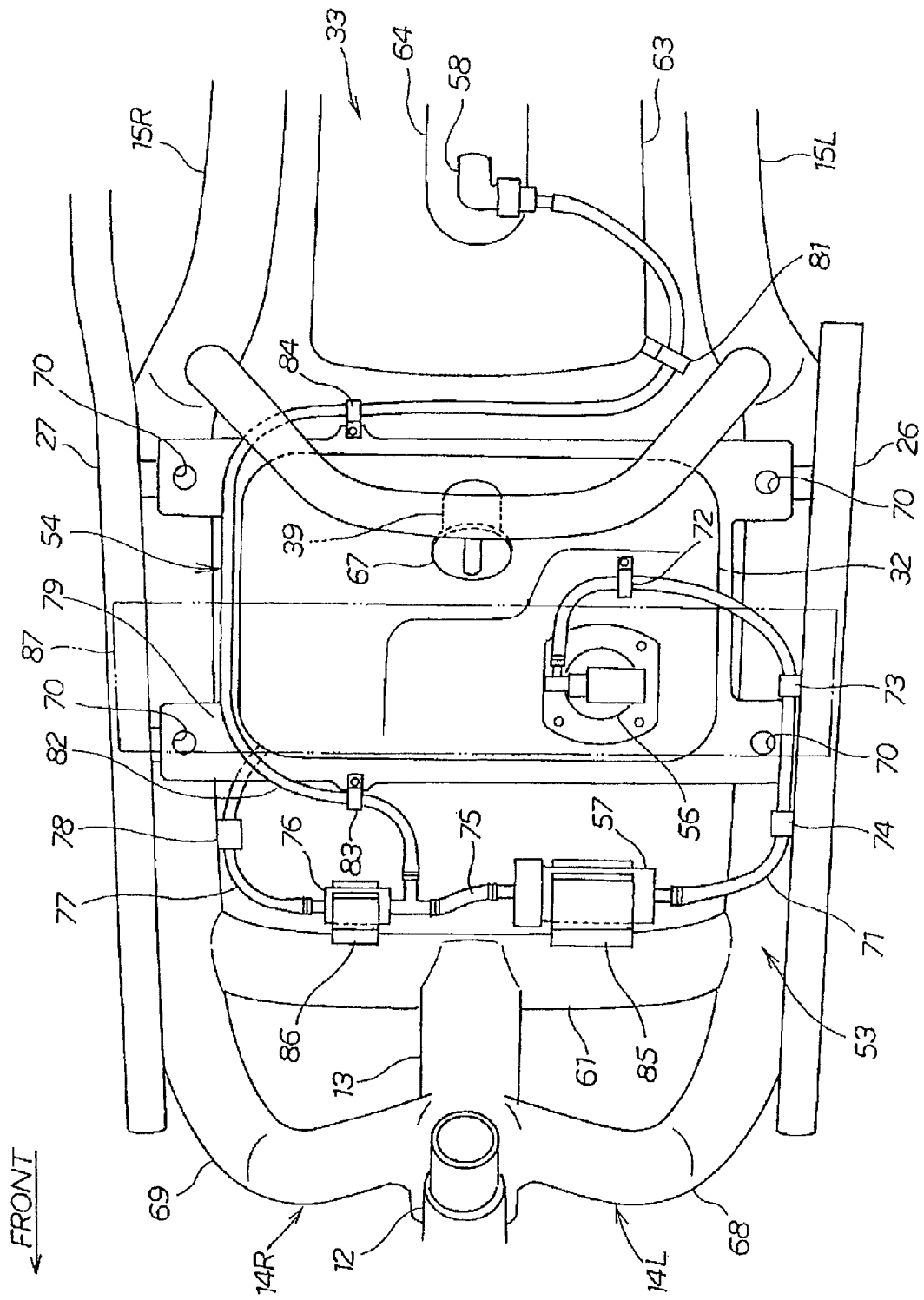
FIG. 3 is a plan view of an essential portion of the scooter-type vehicle.

Referring to FIG. 3, the lower frames 14L and 14R are composed of a left lower frame portion 68 and a right lower frame portion 69, respectively. A cross pipe 61 extending in the vehicle-width direction is spanned between the left and right lower frame portions 68 and 69 at a position forward of the fuel pump 32. The fuel tank 32 is supported by fastening members passed through corresponding fastening holes 70 and fastened at four positions to the fuel tank support brackets (reference number 31 in FIG. 1) provided on the left and right lower frame portions 68 and 69.

The fuel supply device 53 includes the fuel tank 32, the fuel supply passage 54, a pressure regulator 76 connected between a fuel pipe 75 and a fuel pipe 82, and a return pipe 77 connecting the pressure regulator 76 with the fuel tank 32. The fuel supply passage 54 includes a fuel pipe 71 connecting the fuel filter 57 with the fuel pump 56 attached to the fuel tank 32; and fuel pipes 75 and 82 connecting the fuel filter 57 with the injector 58.

The fuel pipe 71 is held by a pipe clip 72 welded to the upper surface of the fuel tank 32 and pipe clips 73 and 74 provided on the floor pipe 26, and led from the fuel pump 56 to the fuel filter 57 located forward of the fuel tank 32 to connect the fuel pump 56 with the fuel filer 57. The fuel pipe 75 is connected to the fuel filter 57 and to the pressure regulator 76 disposed to adjacently align with the fuel filer 57 in the vehicle-width direction. The fuel pipe 82 is connected to an upstream branch side of the pressure regulator 76. In addition, the fuel pipe 82 is held by pipe clips 83 and 84 provided on the fuel tank 32 and a pipe clip 81 provided on the cylinder portion 63 and connected to the injector 58. In this way, fuel in the fuel tank 32 is supplied from the injector 58 toward the engine 33.

The fuel filter 57 is disposed between the cross pipe 61 and the fuel tank 32 so that its longitudinal axis extends in the vehicle-width direction similarly to the cross pipe 61 extending in the vehicle-width direction.

The pressure regulator 76 is disposed to have a longitudinal direction extending along the vehicle-width direction and to adjacently align with the fuel filter 57 in the vehicle-width direction similarly to the cross pipe 61 extending in the vehicle-width direction.

The pressure regulator 76 is provided to return part of the fuel to a lower portion of the fuel tank 32 via the return pipe 77 when fuel pressure between the fuel pump 56 and the injector 58 in the fuel supply passage 54 increases and reaches a predetermined pressure. The return pipe 77 is held by a pipe clip 78 provided on the right lower frame portion 69, and led from the pressure regulator 76 to the lower portion of the fuel tank 32 located on the back of the pressure regulator 76 to connect the pressure regulator 76 with the lower portion of the fuel tank 32.

Incidentally, the fuel filter 57 is held by a filter support clip 85 (detailed later) provided on the cross pipe 61. The pressure regulator 76 is held by a regulator support clip 86 provided on the cross pipe 61. Reference symbol 87 denotes a cross plate spanned between the left and right floor pipes 26 and 27.

A description is next given of attachment of the fuel filter 57 and the pressure regulator 76.

Figure 4:
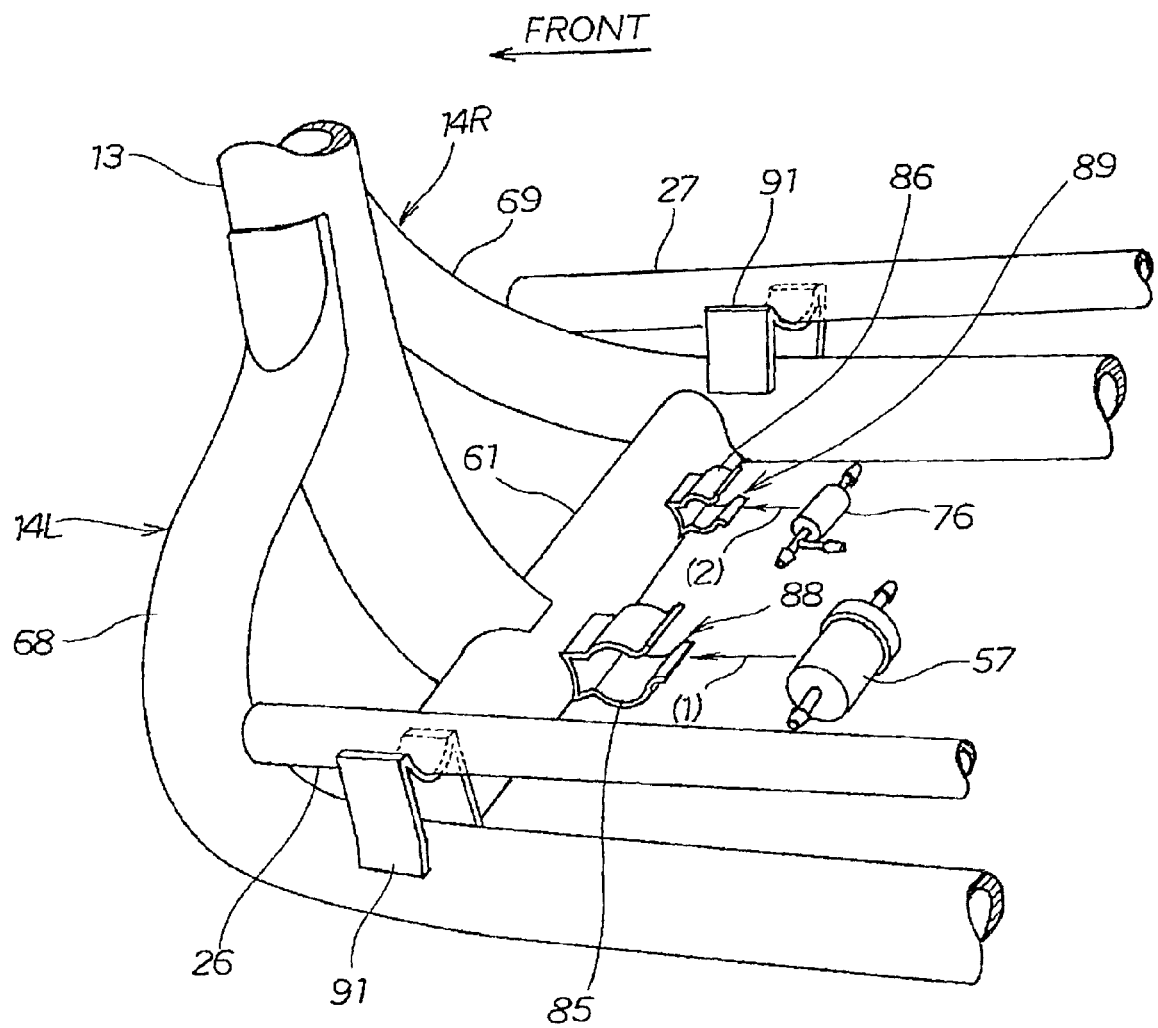
FIG. 4 is a view for assistance in explaining attachment of a fuel filter.

Referring to FIG. 4, the filter support clip 85 attached to the cross pipe 61 is formed of an elastically deformable material in a general C-shape. In addition, an opening portion 88 of the filter support clip 85 slightly rolls outwardly. Thus, it becomes easy for the filter support clip 85 to receive a cylindrical object with a diameter greater than the width of the opening portion 88.

The fuel filter 57 has a cylindrical shape. The fuel filer 57 is displaced along arrow (1) and pushed into the opening portion 88 of the filter support clip 85. Thus, the opening portion 88 of the filter support clip 85 is elastically deformed and broadened. When the fuel filter 57 enters the back of the opening portion 88, the opening portion 88 becomes narrow to hold the fuel filter 57.

Similarly, also the regulator support clip 86 is formed of an elastically deformable material in a general C-shape.

Also for the attachment of the pressure regulator 76, similarly to the fuel filer 57, the pressure regulator 76 is displaced along arrow (2) and pressed into an opening portion 89 of the regulator support clip 86. Thus, the pressure regulator 76 is attached to the regulator support clip 86.

Incidentally, the left and right floor pipes 26 and 27 are secured to respective stays 91 provided on the left and right lower frame portions 68 and 69, respectively.

The filter support clip 85 is next described in detail.

Figure 5A:
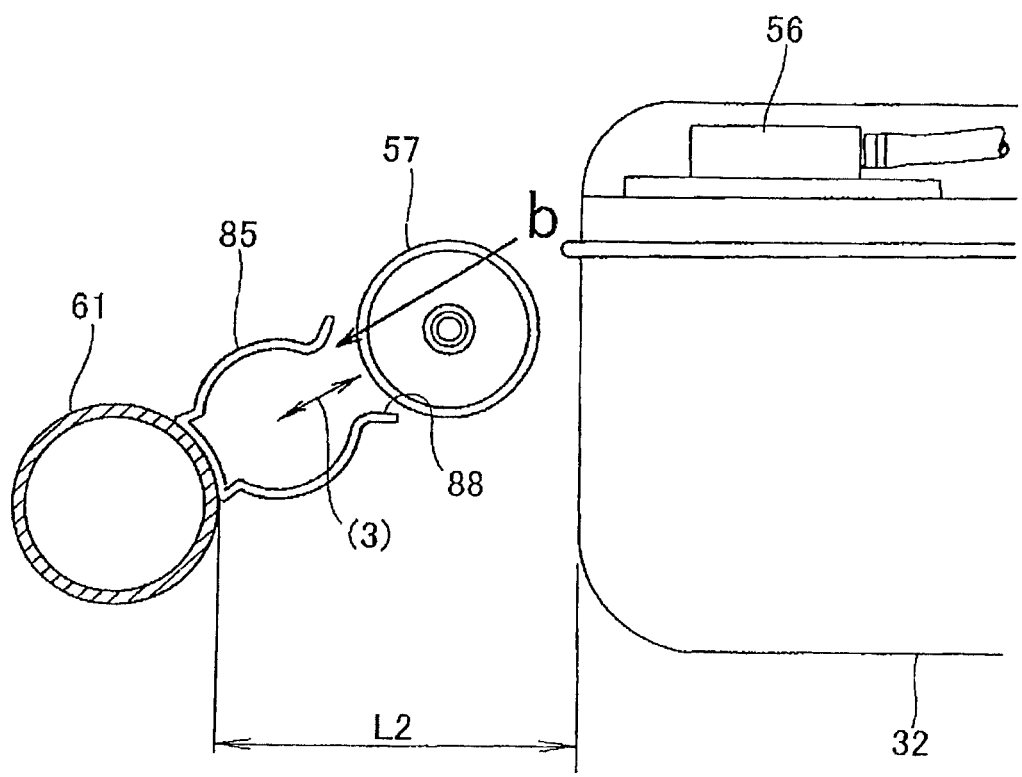
FIG. 5 is a view for assistance in explaining a filter support clip.

Referring to FIG. 5(a), the generally C-shaped filter support clip 85 is provided on the cross pipe 61 so as to open toward the obliquely rearward upside of the vehicle. In this way, the attachment and detachment direction of the fuel filter 57 is also an oblique direction as indicated with arrow (3). A distance L2 of a working space in the back and forth direction of the vehicle can be reduced compared with the case where the attachment and detachment direction of the fuel filter 57 is a horizontal direction. In addition, the fuel filter 57 and the fuel tank 32 can be disposed close to each other.

Incidentally, the same holds true for the regulator support clip (reference numeral 86 in FIG. 4).

Figure 5B:
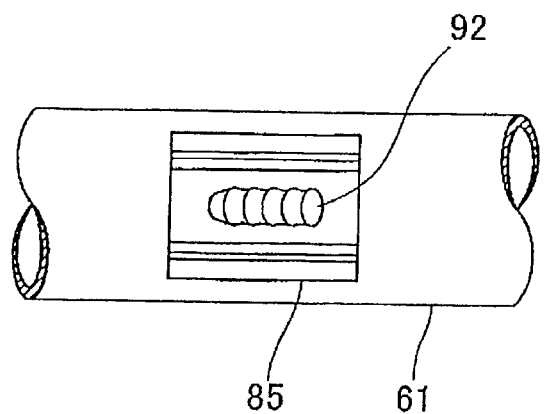

FIG. 5(b) is a view as viewed from arrow "b" of FIG. 5(a). The filter support clip 85 is provided with an elongate hole in the bottom thereof. By welding this portion the filter support clip 85 can be secured to the cross pipe 61. Reference numeral 92 denotes a welding portion. Incidentally, this also applies to the regulator support clip 86.

A description is next given of an access hole of the fuel filter 57.

Figure 6:
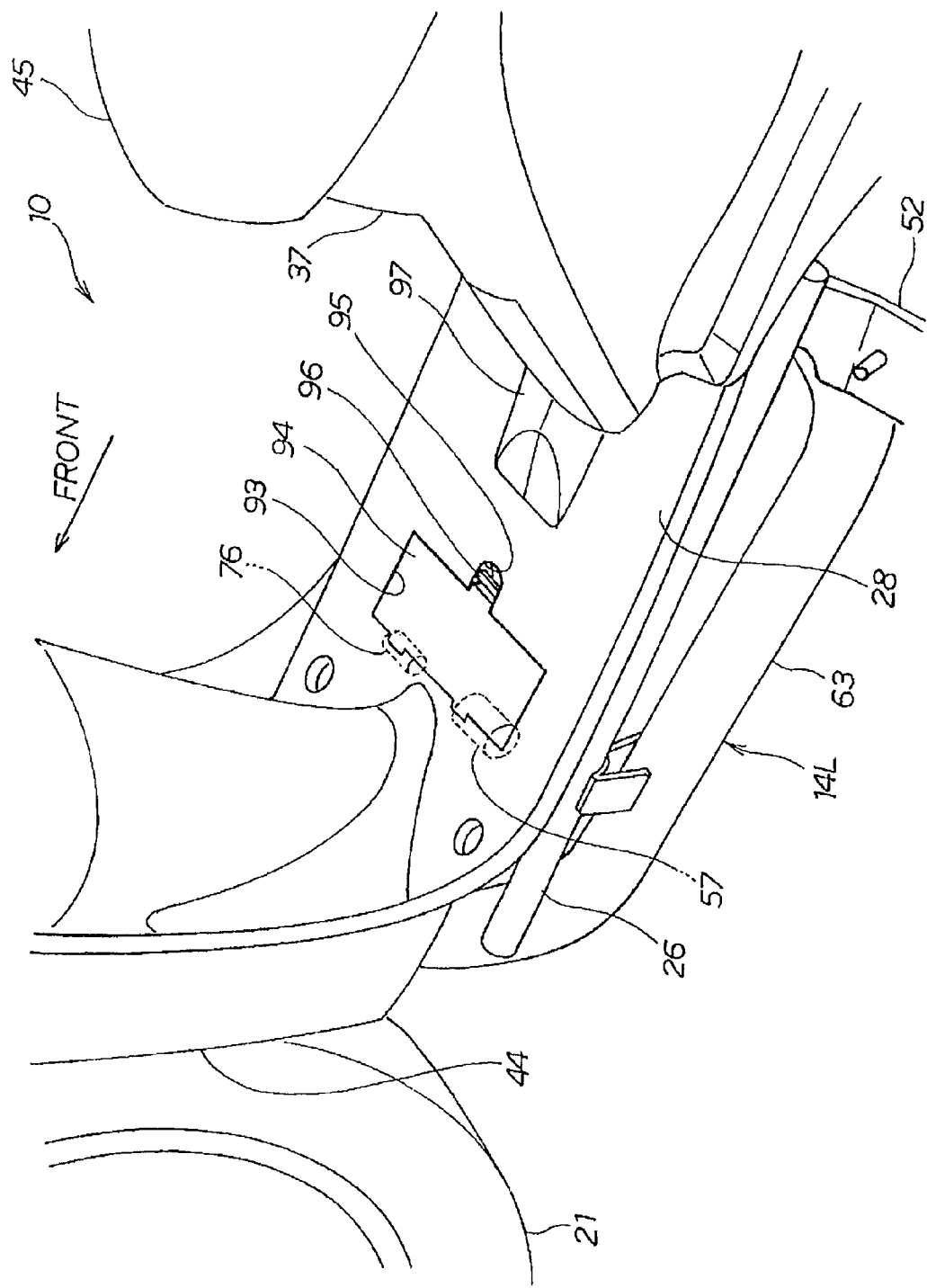
FIG. 6 is a perspective view of the scooter-type vehicle, illustrating an access hole.

Referring to FIG. 6, the step floor 28 is provided with an access hole 93 above the fuel filter 57 and the pressure regulator 76. In addition, the step floor 28 is provided with a lid 94 used to open and close the access hole 93. The access hole 93 is provided with a recessed portion 95. One's finger is put into the recessed portion 95 and put on a projecting portion 96 of the lid 94 for opening and closing the lid 94.

Incidentally, reference numeral 97 denotes a fuel filler lid.

The position of the access hole 93 is next described.

Figure 7:
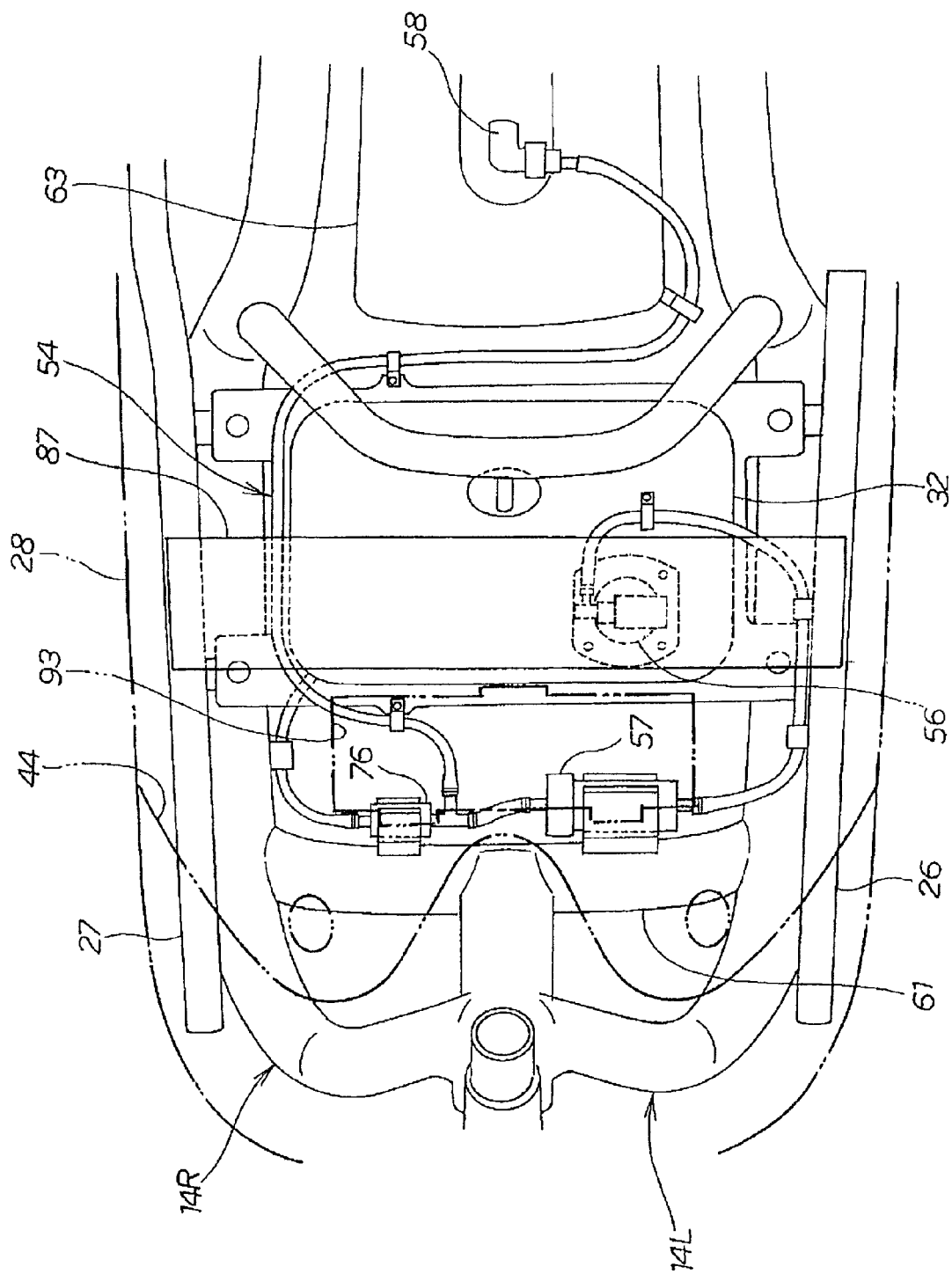
FIG. 7 is a plan view illustrating the positional relationship between the access hole and the fuel filter.

Referring to FIG. 7, the access hole 93 opens from the rear portion of the fuel filter 57 and of the pressure regulator 76 to the front portion of the fuel tank 32. The fuel filter 57 is not supported by the filter support clip 85 by use of a tool or the like. Therefore, it is not necessary for the access hole 93 provided in the step floor 28 to open immediately above the fuel filter 57. It is only necessary for the access hole 93 to open from the rear portion of the fuel filter 57 to the front of the fuel tank 32 at minimum. Consequently, the length of the access hole 93 can be reduced in the back and forth direction of the vehicle.

The vehicle-widthwise length of the access hole 93 is from the left end of the fuel filter 57 to the right end of the pressure regulator 76.

A description is next given of the opening and closing of the lid 94 of the access hole 93.

Figure 8:
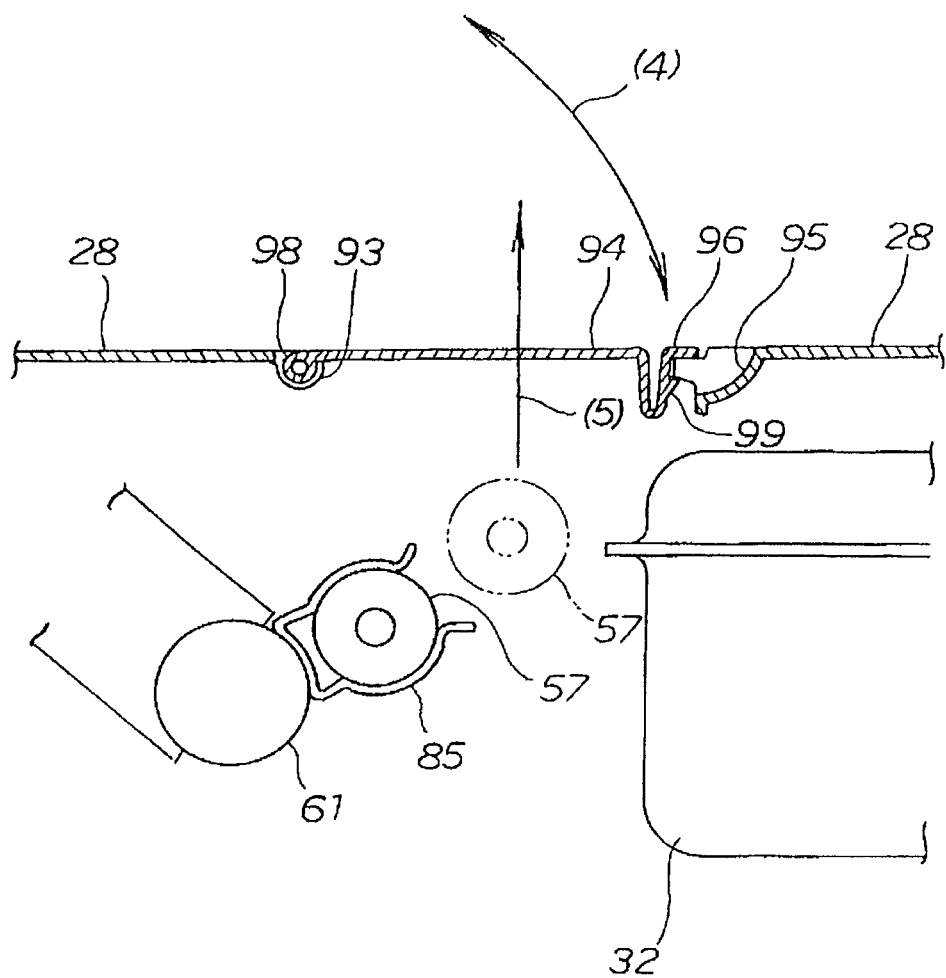
FIG. 8 is a view for assistance in explaining opening and closing of a lid of the access hole.

Referring to FIG. 8, the lid 94 used to open and close the access hole 93 is provided with a hinge 98. One's finger is put into the recessed portion 95 and the lid 94 is opened and closed around the hinge 98 as indicated with arrow (4). The projecting portion 96 is provided with a claw 99. This claw 93 engages the step floor 28 to maintain the lid 94 in the closed state.

While the lid 94 is opened, the fuel filter 57 depicted with an imaginary line is taken out as indicated with arrow (5).

The fuel filter 57 is next described.

Figure 9:
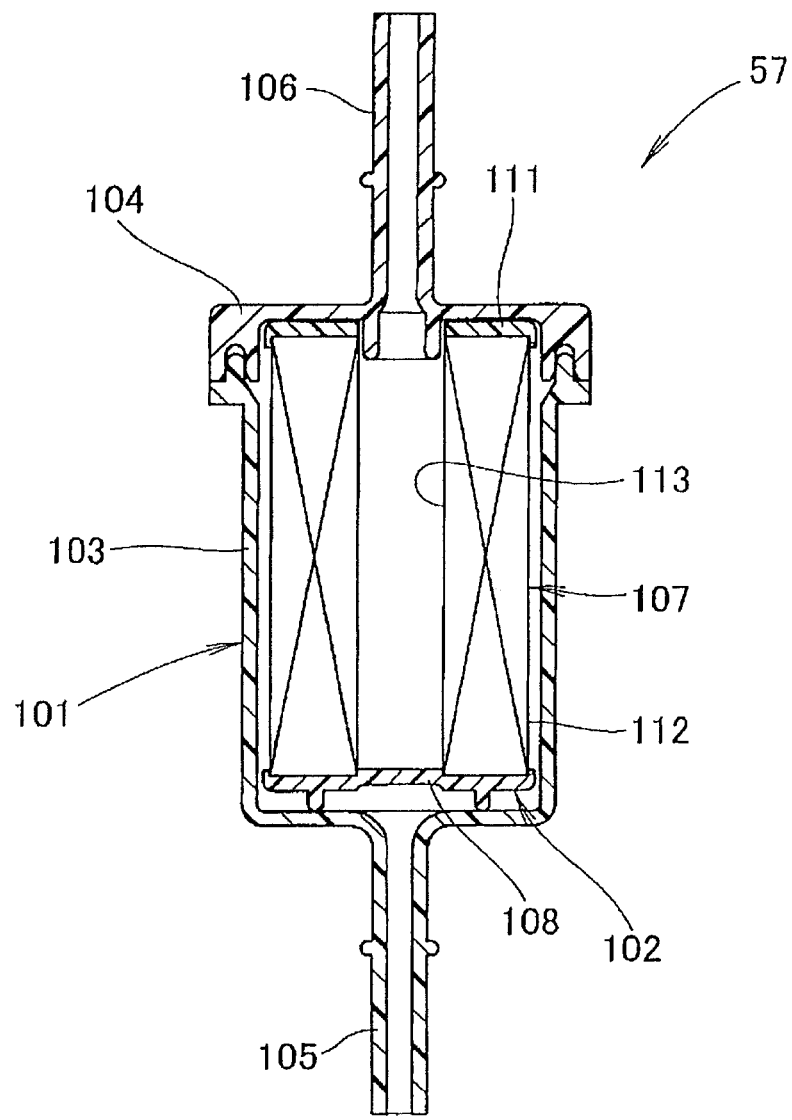
FIG. 9 is a cross-sectional view of the fuel filter.

Referring to FIG. 9, the fuel filter 57 includes a filter case 101 and a filter assembly 102 housed in the filter case 101.

The filter case 101 is composed of a bottomed cylindrical case body 103 and a case cover 104 covering an opening portion of the case body 103.

The case body 103 is provided with a fuel suction port 105 for sucking fuel coupled to the fuel pipe (reference numeral 71 in FIG. 3) on the side of the fuel tank (reference numeral 32 in FIG. 3). In addition, the case cover 104 is provided with a fuel discharge port 106 for discharging fuel coupled to the fuel pipe (reference numeral 75 in FIG. 3) on the side of the injector (reference numeral 58 in FIG. 3).

The filter assembly 102 includes a cylindrical filter 107 made of filter-paper and frames 108, 111 supporting both ends of the filter 107. The filter assembly 102 is fixedly put between the case body 103 and the case cover 104.

Fuel is sucked into the filter case 101 from the fuel suction port 105, passes through the filter 107 in such a manner as to flow from its outer circumferential surface 112 to its inner circumferential surface 113 for filtration, and is discharged from the fuel discharge port 106 to the outside of the filter case 101.

Figure 10:
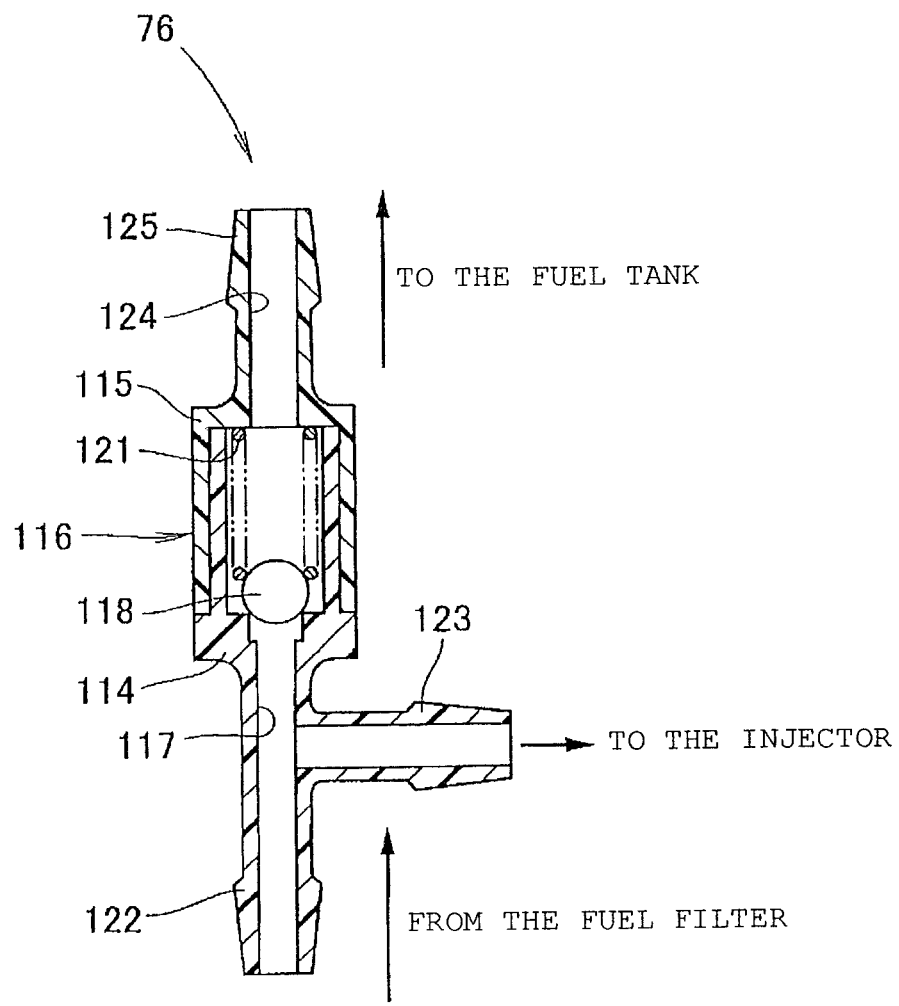
FIG. 10 is a cross-sectional view of a pressure regulator.

Referring to FIG. 10, the pressure regulator 76 includes a case 116 formed by joining a resin-made first case 114 to a resin-made second case 115; a steel-made spherical valve body 118 for opening and closing a through-hole 117 bored in a one end side bottom of the case 116; and a compression coil spring 121 for biasing the valve body 118 to close the through-hole 117. In addition, the pressure regulator 76 includes a fuel suction port 122 bored with the through-hole 117; a fuel discharge port 123 formed in an intermediate portion of the fuel suction port 122; and a fuel return port 125 bored with a through-hole 124 bored in the other end side bottom of the case 116.

The fuel suction port 122 is connected to the fuel filter (reference numeral 57 in FIG. 3). The fuel discharge port 123 is connected to the injector (reference numeral 58 in FIG. 3). The fuel return port 125 is connected to the fuel tank (reference numeral 32 in FIG. 3).

As illustrated in FIGS. 1, 2 and 3, in the scooter-type vehicle 10 including the body frame 11 including the down frame 13 extending downward from the head pipe 12, the lower frames 14L and 14R extending rearward from the lower portion of the down frame 13 and the rear frames 15L and 15R extending rearward and obliquely upward from corresponding rear portions of the lower frames 14L and 14R; the step floor 28 which is disposed above the lower frames 14L and 14R and on which rider's feet are placed; the fuel tank 32 disposed rearward of the down frame 13 and below the step floor 28; the engine 33 swingably supported in rear of the fuel tank 32 by the body frame 11; the fuel supply passage 54 for supplying the fuel in the fuel tank 32 toward the engine 32; and the fuel filter 57 for purifying fuel disposed in the intermediate portion of the fuel supply passage 54, the fuel filter 57 is disposed between the down frame 13 and the fuel tank 32 in the back and forth direction of the vehicle.

With this configuration, the size of the fuel filter 57 can freely be set without being restricted by the swing of the engine 33 disposed to the rear of the fuel tank 32.

Additionally, the space between the down frame 13 and the fuel tank 32 tends to become a dead space. However, in this embodiment, the fuel filter 57 is disposed in the space defined between the down frame 13 and the fuel tank 32. Therefore, the dead spaced defined between the down frame 13 and the fuel tank 32 can effectively be utilized.

As illustrated in FIG. 3, the lower frames 14L and 14R are composed of the left lower frame portion 68 and the right lower frame portion 69, respectively. The cross pipe 61 extending in the vehicle-width direction is spanned between the left and right lower frame portions 68 and 69 at a position forward of the fuel pump 32. The fuel filter 57 is disposed between the cross pipe 61 and the fuel tank 32 so that the longitudinal direction of the fuel filter 57 extends in the vehicle-width direction.

With this configuration, the cross pipe 61 and the fuel tank 32 can be disposed as close to each other as possible. Therefore, the vehicle can be downsized in the back and forth direction of the vehicle.

Additionally, the cross pipe 61 exists in vehicle-front of the fuel filter 57 and the lower frame portions 68 and 69 exist on the left and right, respectively, of the vehicle. Therefore, the fuel filter 57 can be protected by the cross pipe 61 and the lower frames 14L and 14R.

As illustrated in FIG. 2, the fuel filter 57 is disposed such that its lower end is located at a position higher than the lower end of the cross pipe 61 as viewed from the side of the vehicle.

With this configuration, the lower portion of the fuel filter 57 can be protected by the cross pipe 61.

As illustrated in FIG. 4, the filter support clip 85 formed in a general C-shape and supporting the fuel filter 57 is provided on the cross pipe 61. The fuel filter 57 is detachably attached to the cross pipe 61 by elastically deforming the filter support clip 85.

With this configuration, attachment and detachment work for the fuel filter 57 can easily be performed without using a tool.

As illustrated in FIG. 5, the filter support clip 85 is open toward the obliquely rearward upside of the vehicle. In this way, the attachment and detachment direction of the fuel filter 57 is an oblique direction. A shorter distance between the filter support clip 85 and the fuel tank 32 in the back and forth direction of the vehicle to attach and detach the fuel filter is required, compared with the case where the attachment and detachment direction of the fuel filter 57 is a horizontal direction. Therefore, the fuel filter 57 and the fuel tank 32 can be disposed close to each other. Thus, the vehicle can be downsized in the back and forth direction of the vehicle.

As illustrated in FIGS. 2, 3, 6, 7 and 8, the pump-anterior filter 55 for purifying the fuel in the fuel tank 32, the fuel pump 56 disposed on the downstream side of the pump-anterior filter 55, the fuel filter 57 disposed on the downstream side of the fuel pump 56, and the injector 58 for injecting fuel toward the engine 33 are arranged on the fuel supply passage 54 in this order. The fuel filter 57 is set to have finer meshes than those of the pump-anterior filter 55. The step floor 28 is provided with the access hole 93 above the fuel filter 57. In addition, the step floor 28 is provided with the lid 94 used to open and close the access hole 93.

With this configuration, the pump-anterior filter 55 can capture large dust and the fuel filter 57 can capture the fine dust that has passed through the pump-anterior filter 55. Since the fuel filter 57 does not capture large dust, it can be made hard to be clogged, which can reduce its replacement frequency. Additionally, since the pump-anterior filter 55 has the coarse meshes, it can be made hard to be clogged. Thus, the pump-anterior filter 55 can be prevented from serving as resistance against the fuel pump 56, so that an inexpensive fuel pump 56 can be employed.

Consequently, the replacement cycle of both the pump-anterior filter 55 and the fuel filter 57 can be lengthened and the frequency of maintenance can be reduced. In addition, an amount of fuel passing through the pump-anterior filter 55 and the fuel filter 57 can satisfactorily be maintained for a long period of time. Even if a necessary fuel flow rate increases suddenly, the pump-anterior filter and the fuel filter can sufficiently deal with such an event.

Since the fuel filter 57 has fine meshes, it can capture fine dust even in the case of using fuel with fine dust such as ethanol. On the other hand, the fuel filter 57 is set to have finer meshes than those of the pump-anterior filter 55 in order to make it possible to use even fuel with fine dust such as ethanol. Therefore, the fuel filter 57 becomes shorter in replacement cycle than the pump-anterior filter 55. However, since the step floor 28 is provided with access hole 93 and the openable/closable lid 94 for maintenance, the replacement work can be facilitated.

Further, since the fuel filter 57 can be attached to and detached from the filter support clip 85 without use of a tool, it is not necessary for the step floor 28 to be provided with such a large access hole 93 as to receive a tool insertable thereinto. Therefore, it is possible to make small the access hole 93 and the maintenance lid 94 provided in the step floor 28, the maintenance lid 94 being used to open and close the access hole 93.

As illustrated in FIGS. 6, 7 and 8, the pressure regulator 76 for returning part of fuel to the fuel tank 32 when fuel pressure between the fuel pump 56 and the injector 58 in the fuel supply passage 54 increases and reaches a predetermined pressure is provided on the downstream side of the fuel filter 57. The pressure regulator 76 is disposed below the access hole 93 so as to have a longitudinal direction running along the vehicle-width direction and to adjacently align with the fuel filer 57 in the vehicle-width direction.

With this configuration, by using the access hole 93 provided in the step floor 28, the attachment and detachment of the pressure regulator 76 can be done along with the attachment and detachment of the fuel filter 57.

As illustrated in FIG. 2, the fuel filter 57 is disposed at a position lower than the injector 58 in the vertical direction of the vehicle.

With this configuration, in the case where the vehicle is parked for a long period of time, it is possible to prevent fuel from leaking from the injector 58 due to the weight of the fuel staying in the fuel filter 57.

Incidentally, it is reasonable that the present embodiment is applied to not only the scooter-type vehicle 10 on which the engine runs on gasoline is mounted but also the scooter-type vehicle 10 on which the engine 33 runs on bio-fuel such as ethanol or the like is mounted, provided that such fuel can be purified by the fuel filter 57.

The disclosure is suitable at least for scooter-type vehicles provided with a fuel filter on the outside of a fuel tank.

Although a specific form of embodiment of the instant invention has been described above and illustrated in the accompanying drawings in order to be more clearly understood, the above description is made by way of example and not as a limitation to the scope of the instant invention. It is contemplated that various modifications apparent to one of ordinary skill in the art could be made without departing from the scope of the invention which is to be determined by the following claims.

We claim:

1. A vehicle, comprising:
   a body frame including
      a down frame extending downwardly from a head pipe,
      a lower frame extending rearwardly from a lower portion of said down frame, and
      a rear frame extending rearwardly and obliquely upward from a rear portion of said lower frame;
   a step floor disposed above said lower frame;
   a fuel tank disposed rearwardly of said down frame and below said step floor;
   an engine swingably supported by said body frame behind said fuel tank;
   a fuel supply passage for supplying fuel in said fuel tank to said engine;
   a fuel filter for purifying fuel, disposed in an intermediate portion of said fuel supply passage; and a filter support clip formed in a general C-shape and which supports said fuel filter, wherein said fuel filter is disposed between said down frame and said fuel tank, in a front-to-rear direction of the vehicle, wherein said lower frame is composed of left and right lower frame portions, wherein a cross pipe extending in a vehicle-width direction is spanned between the left and right lower frame portions at a position forward of said fuel tank, wherein said fuel filter is disposed between said cross pipe and said fuel tank, such that a longitudinal direction of said fuel filter runs along the vehicle-width direction, wherein said fuel filter is disposed such that a lower end of said fuel filter is higher than a lower end of said cross pipe, and wherein said fuel filter is detachably attached to said cross pipe by elastically deforming said filter support clip.

2. The vehicle according to claim 1, wherein said filter support clip is open toward an oblique rearward and upward direction of the vehicle.

3. The vehicle according to claim 2,
wherein a pump-anterior filter for purifying fuel in said fuel tank, a fuel pump, and an injector for injecting fuel toward said engine are arranged on said fuel supply passage in this order;
wherein said fuel filter is disposed on the downstream side of said fuel pump;
wherein said fuel filter has finer meshes than meshes of said pump-anterior filter; and
wherein said step floor is provided above said fuel filter with an access hole and a lid used to open and close said access hole.

4. The vehicle according to claim 3,
wherein a pressure regulator for returning fuel to said fuel tank when fuel pressure between said fuel pump and said injector in the fuel supply passage increases and reaches a predetermined pressure is provided on the downstream side of said fuel filter, and
wherein the pressure regulator is disposed below said access hole has a longitudinal direction running along the vehicle-width direction, such that said pressure regulator is adjacently aligned with said fuel filter in the vehicle-width direction.

5. The vehicle according to claim 4, wherein said fuel filter is disposed at a position lower than said injector in a vertical direction of the vehicle.

6. The vehicle according to claim 3, wherein said fuel filter is disposed at a position lower than said injector in a vertical direction of the vehicle.

7. The vehicle according to claim 1,
wherein a pump-anterior filter for purifying fuel in said fuel tank, a fuel pump, and an injector for injecting fuel toward said engine are arranged on said fuel supply passage in this order;
wherein said fuel filter is disposed on the downstream side of said fuel pump;
wherein said fuel filter has finer meshes than meshes of said pump-anterior filter; and
wherein said step floor is provided above said fuel filter with an access hole and a lid used to open and close said access hole.

8. The vehicle according to claim 7,
wherein a pressure regulator for returning fuel to said fuel tank when fuel pressure between said fuel pump and said injector in the fuel supply passage increases and reaches a predetermined pressure is provided on the downstream side of said fuel filter, and
wherein the pressure regulator is disposed below said access hole has a longitudinal direction running along the vehicle-width direction, such that said pressure regulator is adjacently aligned with said fuel filter in the vehicle-width direction.

9. The vehicle according to claim 8, wherein said fuel filter is disposed at a position lower than said injector in a vertical direction of the vehicle.

10. The vehicle according to claim 7, wherein said fuel filter is disposed at a position lower than said injector in a vertical direction of the vehicle.

* * * * *